US005606501A

United States Patent [19]
Gioutsos et al.

[11] Patent Number: 5,606,501
[45] Date of Patent: Feb. 25, 1997

[54] METHOD FOR DAMPING CRASH-DISCRIMINATION MEASURES

[75] Inventors: Tony Gioutsos, Brighton; Michael A. Piskie, Bloomfield Hills; Daniel N. Tabar, Troy, all of Mich.

[73] Assignee: Automotive Systems Laboratory, Inc., Farmington Hills, Mich.

[21] Appl. No.: 288,597

[22] Filed: Aug. 10, 1994

Related U.S. Application Data

[63] Continuation-in-part of Ser. No. 773,017, Oct. 8, 1991, Pat. No. 5,508,918, and Ser. No. 773,676, Oct. 8, 1991, Pat. No. 5,337,238.

[51] Int. Cl.⁶ ........................................... B60R 21/16
[52] U.S. Cl. ............................ 364/424.045; 340/436; 280/735; 180/282
[58] Field of Search .................... 364/424.05; 280/728.1, 280/734, 735; 180/274, 282; 340/436, 438

[56] References Cited

U.S. PATENT DOCUMENTS

| | | | |
|---|---|---|---|
| 3,911,391 | 10/1975 | Held et al. | 280/735 |
| 4,994,972 | 2/1991 | Diller | 364/424.05 |
| 5,021,678 | 6/1991 | Diller | 280/734 |
| 5,157,268 | 10/1992 | Spies et al. | 280/735 |
| 5,229,943 | 7/1993 | Eigler et al. | 364/424.05 |
| 5,282,134 | 1/1994 | Gioutsos et al. | 364/424.05 |
| 5,337,238 | 8/1994 | Gioutsos et al. | 364/424.05 |
| 5,363,302 | 11/1994 | Allen et al. | 364/424.05 |
| 5,419,407 | 5/1995 | Meyer et al. | 180/274 |
| 5,424,584 | 6/1995 | Matsuda et al. | 340/438 |

Primary Examiner—Vincent N. Trans

[57] ABSTRACT

In a system and method for controlling actuation of a vehicle passenger safety device, wherein a first time-varying measure $m_1(t)$, itself a function of received vehicle acceleration information, is accumulated to obtain a second time-varying measure $m_2(t)$ for subsequent comparison with a threshold value therefor, the first measure $m_1(t)$ is "damped" prior to accumulation by subtracting therefrom a correction value or "damping factor $f_d$." The damping factor $f_d$ may be either a constant or a time-varying function $f_d(t)$ of one or more other time-varying measures, themselves based on received vehicle acceleration information.

10 Claims, 1 Drawing Sheet

METHOD FOR DAMPING CRASH-DISCRIMINATION MEASURES

CROSS-REFERENCE TO RELATED APPLICATIONS

The instant application is a continuation-in-part of U.S. patent application Ser. No. 07/773,017, entitled "Predictor/Check Crash Discriminator," and of U.S. patent application Ser. No. 07/773,676, entitled "System and Method For Actuating Vehicle Safety Device Using Damped Measures," each of which was filed on Oct. 8, 1991, now U.S. Pat. No. 5,508,918 and U.S. Pat. No. 5,337,238, respectively.

BACKGROUND OF THE INVENTION

The instant invention relates to systems and methods for triggering the actuation of vehicle safety devices and, more particularly, to systems and methods which integrate or accumulate received physical information to obtain one or more measures with which to detect conditions requiring actuation of the safety device thereby to provide superior response to a wider variety of crash scenarios.

A variety of systems and methods for actuating vehicle safety devices are well known in the art. Such systems are used to sense a crash condition and, in response to such a condition, to actuate an air bag, or lock a seat belt, or actuate a pretensioner for a seat belt retractor. Typically, the safety device is actuated into its protective position when an impact exceeding a predetermined magnitude is detected by the actuating system.

Significantly, known systems and methods for actuating vehicle safety devices rely on changes in one or more estimated physical quantities or "measures" in determining whether to actuate the safety device, e.g., a vehicle velocity measure estimated by integrating or accumulating received vehicle acceleration information over time. A sliding window is typically used so as to include only the last n values of vehicle acceleration information when determining these measures. As a result, these methods suffer from what might best be described as a "memory" problem—for example, once an additional n values for temporal vehicle acceleration have been proffered by an accelerometer, the previous "nth+1" vehicle acceleration value will no longer be used in determining a temporal value for the measure, whether that "nth+1" value was itself extreme, equivocal or insignificant.

An alternative approach of known systems and methods is to start a timer when a minimum threshold value for a particular measure has been exceeded, whereafter the measure must also exceed a maximum threshold value before the timer runs out in order to trigger actuation of the safety device. Should the timer run out before the maximum threshold value is exceeded, the system resets and the analysis begins again.

What is needed is a system and method for actuating a vehicle passenger safety device which utilizes one or more time-varying measures, themselves functions of received physical information such as received vehicle acceleration information or transitory passenger position information, wherein the effect of older received physical information is gradually rather than abruptly eliminated from the measures, thereby providing a kind of "memory" of past received physical information serving to enhance responsiveness to a wider variety of crash conditions.

SUMMARY OF THE INVENTION

It is an object of the instant invention to provide an improved system and method for actuating a vehicle passenger safety device which gradually deemphasizes prior values for received physical information over time.

Another object of the instant invention is to provide a system and method for actuating a vehicle passenger safety device which includes time-varying measures which are employed to weight other time-varying measures.

Yet another object of the instant invention is to provide a system and method for actuating a vehicle passenger safety device wherein at least one intermediate measure used in calculating a first accumulated measure is damped as a function of a second accumulated measure.

Under the invention, in a system and method for controlling actuation of a vehicle passenger safety device, wherein a first time-varying measure $m_1(t)$, itself a function of received physical information such as received vehicle acceleration information or transitory passenger position information, is accumulated to obtain a second time-varying measure $m_2(t)$ for subsequent comparison with a threshold value therefor, the first measure $m_1(t)$ is "damped" prior to accumulation by subtracting therefrom a correction value or "damping factor $f_d$." The damping factor $f_d$ may be either a constant or a function of one or more other time-varying measures approximating such physical quantities as vehicle acceleration, vehicle jerk (differentiated vehicle acceleration), vehicle velocity (integrated vehicle acceleration), relative passenger velocity (as perhaps approximated from temporal relative position sensing means), relative passenger jerk, and/or relative passenger position within the vehicle. Indeed, it will be appreciated that, under the invention, the first measure $m_1(t)$ may be damped by a damping factor $f_d$ which is itself based on a previous value of the accumulated second measure $m_2(t-z)$, i.e., where z represents the time required for one or more clock ticks of the typically digital circuit used to implement the invention.

DETAILED DESCRIPTION OF THE PREFERRED EMBODIMENT(S)

Figure 1:
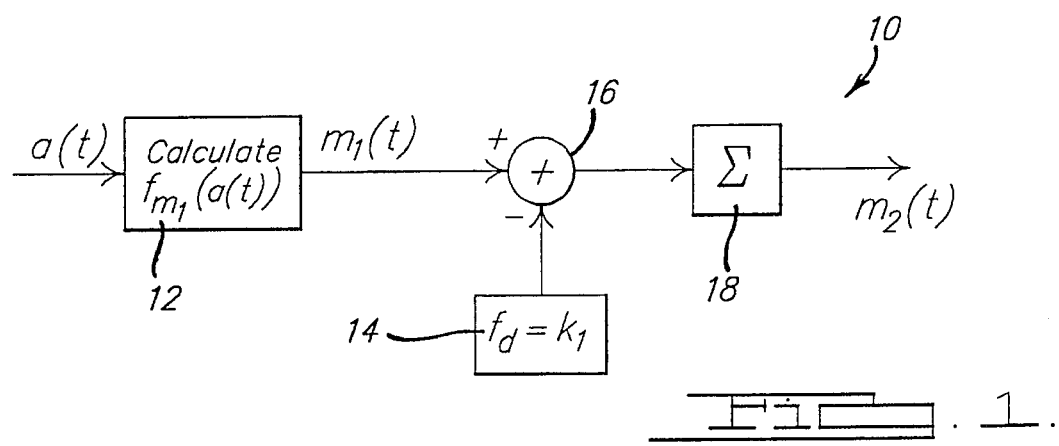
FIG. 1 is a diagrammatic schematic of a first exemplary implementing circuit for use in a system for controlling actuation of a vehicle passenger safety device, wherein the damping factor $f_d$ is a constant.

Referring to the drawings, FIG. 1 shows a first exemplary implementing circuit 10 for use in a system for controlling actuation of a vehicle passenger safety device, such as an air bag (not shown). Specifically, the circuit 10 includes a first means 12 for calculating a first acceleration-based measure $m_1(t)$, a means 14 for generating a damping factor $f_d$, a summing junction 16 for damping the first measure $m_1(t)$ with the damping factor $f_d$ by subtracting the latter from the former, and a first accumulator 18 for accumulating the thus-damped first measure to obtain the desired second (accumulated) measure $m_2(t)$.

As will be appreciated by reference to FIG. 1, under the invention, the first acceleration-based measure $m_1(t)$ is "damped" as follows prior to its integration/accumulation in the first accumulator 12:

$$m_1(t) = \int [f_{m1}(a(t)) - f_d] dt$$

In the first exemplary implementing circuit 10, the damping factor $f_d$ is a constant $k_1$. Thus, where the first measure $m_1(t)$ is raw vehicle acceleration information which might otherwise be accumulated to obtain a second measure $m_2(t)$ representative of vehicle velocity, the damping factor $f_d$ may, for example, approximate the amount of acceleration which a passenger might himself resist. Thus, this amount would be subtracted from each transitory value for vehicle acceleration prior to its accumulation as a velocity-based measure.

Through the use of damping, significant transitory values for each damped measure are removed from the crash detection algorithm in a gradual way, in contrast to the rather abrupt manner typical of prior art approaches. Specifically, the use of damped measures provides useful values for longer periods of time than the sliding window techniques typical of prior art methods, wherein a value can last only as long as the window length. For example, when a vehicle encounters a high amplitude acceleration pulse, there is normally a delay in velocity response. The sliding window technique or clock-based damping will typically operate to reduce or even eliminate the high vehicle acceleration experienced by the vehicle. In contrast, the invention utilizes event-based damping to maintain significant values for a period sufficient to incorporate the values in a useful discrimination algorithm. The use of damping to maintain the impact of past received information becomes particularly important during long crash pulse waveforms requiring actuation of the safety device, or in concatenation of rough road with low MPH crashes which also require actuation of the safety device.

In accordance with another feature of the invention, the damping factor $f_d$ is most preferably a function of another measure itself based on received information, whereby the amount of damping increases or decreases depending upon the frequency and/or significance of various events as calculated from received information rather than on a clock-based measure or sliding window.

Figure 2:
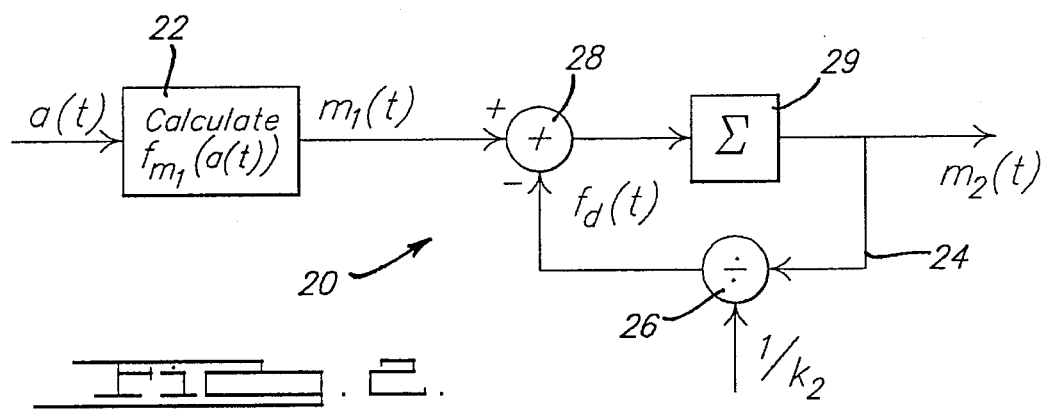
FIG. 2 is a diagrammatic schematic of a second exemplary implementing circuit for use in a system for controlling actuation of a vehicle passenger safety device, wherein the damping factor $f_d$ is itself a percentage of a former value of the second (accumulated) measure $m_2(t)$.

Thus, FIG. 2 shows a second exemplary implementing circuit 20 for use in a system for controlling actuation of a vehicle passenger safety device, such as an air bag (again not shown), wherein the first acceleration-based measure $m_1(t)$ is damped using a time-varying damping factor $f_d(t)$. More specifically, the circuit 20 includes a first means 22 for calculating the first acceleration-based measure $m_1(t)$, and a feedback loop 24 comprising a divider 26 for scaling the previous value for the second (accumulated) measure $m_2(t)$ and inputing the thus-scaled second measure to the summing junction 28 for use in damping the first measure $m_1(t)$. The thus-damped first measure is then input to the first accumulator 29 to obtain the desired second (accumulated) measure $m_2(t)$. In this regard, it is noted that, where a scaling factor $k_2$ of, for example, 2 is desired, the divider 26 is readily implemented in a digital circuit in the form of a shift register.

Stated another way, in the implementing circuit 20 shown in FIG. 2, the time-varying damping factor $f_d(t)$ is itself a percentage of the second (accumulated) measure $m_2(t)$, as best explained by the following equation:

$$m_2(t) = \int_0^t \left[ f_{m1}(a(t)) - \frac{1}{k_2} \int_0^{t-1} m_2(t) dt \right] dt$$

The above equation emphasizes the fact that the damping factor $f_d$ at time t is based in part on the value of the measure $m_2$ as it existed at time $(t-1)$.

One application of the implementing circuit 20 shown in FIG. 2 is that of approximating the output of a velocity-damped integrating accelerometer, in that the transitory mechanical damping of the acceleration signal generated by such an accelerometer is itself proportional to the transitory velocity of its inertial mass.

Figure 3:
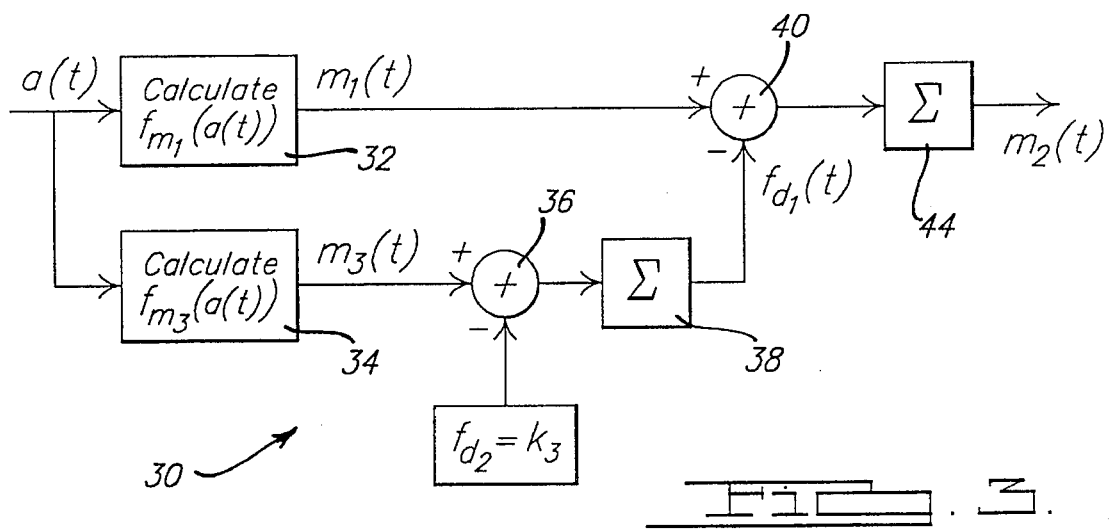
FIG. 3 is a diagrammatic schematic of a third exemplary implementing circuit for use in a system for controlling actuation of a vehicle passenger safety device, wherein the damping factor $f_d$ is itself a function of another time-varying measure $m_3(t)$, such as vehicle jerk.

FIG. 3 shows a third exemplary implementing circuit 30 for use in a system for controlling actuation of a vehicle passenger safety device, wherein the first acceleration-based measure $m_1(t)$ generated by the first calculating means 32 is damped using a damping factor $f_d$ which is itself a damped and accumulated acceleration-based measure. More specifically, the circuit 30 includes a second means 34 for calculating a third time-varying measure $m_3(t)$ based on received acceleration information $a(t)$ over time, indicated generally by the function $f_{m3}(a(t))$ in FIG. 3. The output from the second calculating means 34 is then summed with a second damping factor $f_{d2}$ in a second summing junction 36 and then accumulated in a second accumulator 38 to obtain the first time-varying damping factor $f_{d1}(t)$. As in the first two embodiments described hereinabove, the first time-varying damping factor $f_{d1}(t)$ is thereafter used to damp the first acceleration-based measure $m_1(t)$ in the analogous first summing junction 40, with the resulting damped first measure being accumulated in the analogous first accumulator 44 to obtain the second (accumulated) measure $m_2(t)$.

While the preferred embodiment of the invention has been disclosed, it should be appreciated that the invention is susceptible of modification without departing from the spirit of the invention or the scope of the subjoined claims.

We claim:

1. In a system for controlling actuation of a vehicle passenger safety device, said system including:

means for receiving information from the group consisting of vehicle acceleration information and vehicle passenger position information;

means for calculating a first time-varying measure based on said received information as a function of time;

accumulating means for accumulating said first measure over time to obtain a second time-varying measure; and actuating means responsive to said second measure for actuating said safety device when said second measure exceeds a first threshold value therefor, the improvement comprising:

means for generating a first time-varying damping factor based on said received information; and damping means for damping said first measure prior to accumulation thereof by subtracting said first damping factor from said first measure.

2. The system of claim 1, wherein said means for generating said first damping factor includes a feedback loop for feeding a scaled value for said second measure back to said damping means.

3. The system of claim 1, wherein said means for generating said first damping factor includes means for generating a third time-varying measure based on said received information.

4. The system of claim 3, including means for generating a second damping factor, a second damping means for damping said third measure with said second damping factor by subtracting said second damping factor from said third measure to obtain a damped third measure, and second accumulating means for accumulating said damped third measure to obtain a fourth time-varying measure.

5. The system of claim 4, wherein said second damping factor is a function of said received information over time.

6. In a method for controlling actuation of a vehicle passenger safety device, said method including the steps of:

receiving information from the group consisting of vehicle acceleration information and vehicle passenger position information;

calculating a first time-varying measure based on said received information as a function of time;

accumulating said first measure over time to obtain a second time-varying measure;

comparing said second measure to a first threshold value; and actuating said safety device when said second measure exceeds said first threshold value, the improvement comprising:

generating a time-varying damping factor based on said received information; and damping said first measure prior to accumulation thereof by subtracting said damping factor from said first measure.

7. The method of claim 6, wherein said step of generating said first damping factor includes the steps of scaling said second measure using a scaling factor; and feeding said scaled second measure back to said damping means as said first damping factor.

8. The method of claim 6, wherein said step of generating said first damping factor includes the step of generating a third time-varying measure based on said received information, said third measure being used as said first damping factor.

9. The method of claim 8, further including the steps of generating a second damping factor, damping said third measure with said second damping factor by subtracting said second damping factor from said third measure to obtain a damped third measure, and accumulating said damped third measure to obtain a fourth time-varying measure, said fourth measure being used as said first damping factor.

10. The method of claim 9, wherein said second damping factor is a function of said received information over time.

* * * * *